March 19, 1963 L. D. STEVENS 3,082,406
DECODING DEVICE
Filed Aug. 8, 1957
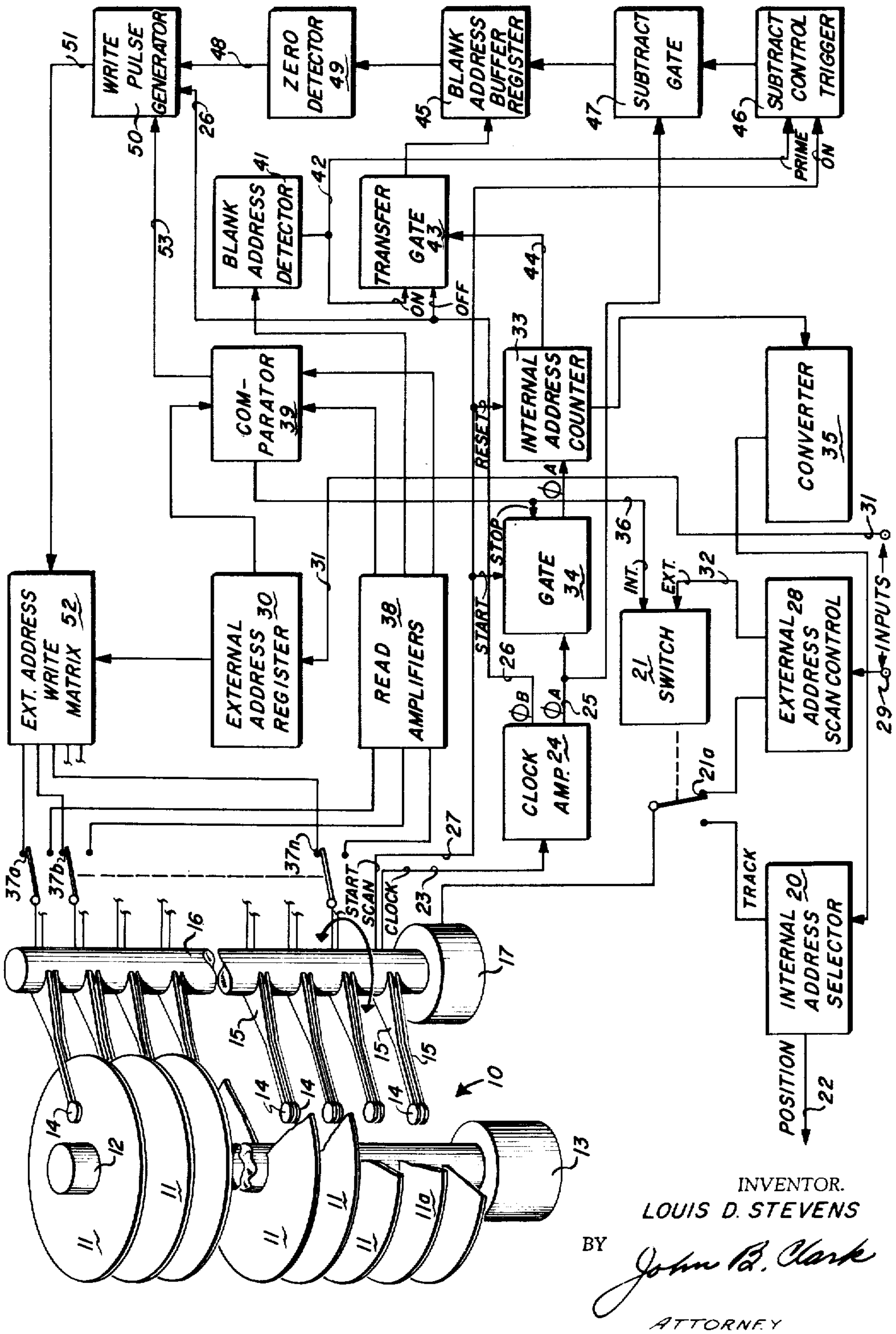
INVENTOR.
LOUIS D. STEVENS
BY John B. Clark
ATTORNEY United States Patent Office 3,082,406

Patented Mar. 19, 1963

3,082,406
DECODING DEVICE

Louis D. Stevens, San Jose, Calif., assignor to International Business Machines Corporation, New York, N.Y., a corporation of New York Filed Aug. 8, 1957, Ser. No. 677,004
9 Claims. (Cl. 340—172.5)

The present invention pertains generally to decoding devices and relates more particularly to a table lookup device for converting information from one form to another.

The embodiment of the invention disclosed herein is directed to structure for converting addresses of stored data from one form to another, although it will be understood that the invention should not be limited to this use. Many other applications wherein it is desired to convert information from one form to another on a table loopup basis will be obvious to those skilled in the art.

Access to selected data stored in any memory device requires specific information regarding the location of the data within the memory. This information is referred to herein as the internal address of the selected data, and when the memory is supplied with the internal address access to the selected data is readily obtained. A problem arises, however, when the data stored in the memory is identified by an established catalog number or a serial number or the like, i.e., by an external address, which does not correspond to the internal address in some uniform manner. If the location of the selected data is to be identified by such as external address, it is necessary to convert the external address to the corresponding internal address before the data can be located in the memory.

An object of the invention, therefore, is to provide an improved table lookup device.

Another object is to provide a new and improved device for converting data from one form to another.

A further object is to provide structure for converting an external address to a corresponding internal address for obtaining access to data stored according to the internal address and defined by the external address.

According to the invention, the various external addresses utilized in connection with a given system are stored in a memory according to the corresponding internal addresses. When supplied with an external address, means are provided for scanning stored external addresses until a comparison between the supplied address and the stored address is obtained, at which time a determination as to the location of the stored address is made. This location defines the internal address.

Thus, a further object is to provide a device for determining an internal address according to the storage location of the corresponding external address.

Still another object is to provide a system wherein external addresses are stored according to the corresponding internal addresses and internal addresses are determined according to comparisons made between supplied and stored external addresses during a scan of the stored external addresses.

When a new external address is entered into the system, i.e., when an address which does not correspond to any particular storage location is supplied, it may be desired to establish a corresponding storage location. To this end, means are provided for detecting unused external address storage locations while the external address storage locations are being scanned. If upon completion of the scanning operation no internal address has been determined, the supplied external address is a new one and means are provided for entering this address into detected unused external address storage locations. In this manner new external addresses are entered for coversions to the associated internal addresses.

A still further object, therefore, is to provide a table lookup device having provisions for extending the table.

Another object is to provide a device of the type described above for determining new external addresses.

Still another object is to provide an address conversion device wherein supplied external addresses are compared with stored external addresses and unused external address storage locations are detected for controlling the entry therein of new external addresses determined by a failure of comparison.

Other objects of the invention will be pointed out in the following description and claims and illustrated in the accompanying drawing, which discloses, by way of example, the principle of the invention and the best mode which has been contemplated of applying that principle.

The drawing depicts a system block diagram of an embodiment of the decoding device of the invention.

Although the disclosed embodiment of the invention is arranged for operation in connection with a storage device such as that shown and described in the copending U.S. application for Letters Patent, Serial No. 584,705, filed May 14, 1956, now Patent No. 3,007,144, in the name of Jacob J. Hagopian, the teaching of the invention permits the application of many other types of storage and the invention should not be limited to the storage device shown.

Referring now to the drawing, the storage medium comprises a magnetic disc file 10 which includes a plurality of discs 11 mounted for rotation on a suitably supported shaft 12 which is driven by a motor 13 in any convenient manner. A plurality of magnetic transducers 14 are provided for cooperating with the planar surfaces of corresponding discs 11, one such transducer 14 being provided for each disc face. Each transducer is supported by a corresponding arm 15, and the various arms are secured to a shaft 16, the radial position of which is controlled by a positioning mechanism 17 to position the arms 15 and transducers 14 adjacent selected portions of the discs 11.

Each disc face may include a number of concentric data storage tracks spaced radially thereon for recording data, and access to selected tracks is obtained by furnishing a suitable internal address to an internal address selector 20. The selector 20 may include a register or the like for storing the internal address, and at an appropriate time the selector 20 connects through the n/o *a* contacts of a switch 21 to the positioning mechanism 17 for controlling it to position the transducers to the track corresponding to the internal address then present in the selector 20.

In addition to indicating the track to which the various transducers are to be positioned for reading or recording data, an internal address may also indicate the disc containing the track as well as the desired portion of that track where serial operation is desired. When parallel operation is utilized, the internal address may indicate a particular storage position on each of the various tracks. In either case, this additional information is taken from the selector 20 via a line 22 for controlling suitable selection circuitry (not shown).

One of the discs, such as the disc 11*a*, is provided for controlling the system timing. This disc contains a conventional clock track which yields signals defining the various storage positions on the various tracks of the several discs. These signals are taken from an associated transducer via a line 23 to an amplifier 24, the amplified clock signals being entered on a line 25. These signals are termed phase A clock pulses. In addition to the phase A pulses, the amplifier 24 is arranged to provide phase B clock pulses on a line 26, which pulses lag the phase A pulses by a convenient fraction of the period thereof. Also recorded on the disc 11a is a so-called reference mark which determines an initial position on all of the various storage tracks. The reference mark provides a signal, referred to as the "start scan" signal, on a line 27 and occurs once each disc revolution for indicating the beginning of the data recorded on the various discs.

In the present embodiment of the invention one or more tracks of each disc 11 are provided for storing the various external addresses. These addresses are recorded in parallel, the various signals which define a given address being recorded in corresponding storage locations of corresponding tracks on each of the various discs. To determine an internal address corresponding to a given external address, the various recorded external address storage positions are scanned and the number of such positions scanned at the time the given external address is sensed determines the corresponding internal address.

The scanning operation is initiated and controlled by the start scan signal together with a "scan control" signal applied to an external address scan control circuit 28 via a line 29. The scan control signal taken from the line 29 indicates that an external address has been entered into an external address register 30 via a line 31 and that the operation for converting the external address to the corresponding internal address is to be initiated. When the scan control signal is applied to the line 29, a signal is sent via a line 32 to the switch 21 for putting it in the condition shown in the drawing. Additionally, means are provided within the external address scan control circuit 28 for controlling the positioning mechanism 17 to position the various transducers at the track containing the various external addresses, if one track is utilized for this purpose, or at the first of the several tracks containing these addresses. In the latter instance, means are also provided within the control unit 28 for controlling the positioning mechanism 17 to step to the next track containing the external addresses upon completion of the scan of each such track. In the present description it will be assumed that but one track is utilized for storing the various external addresses, and in this case the external address scan control unit 28 need only control the positioning of the transducers at that track in response to the scan control signal.

When the various transducers are positioned at the external address storage track, the next following start scan signal taken from the line 27 controls the reset of an internal address counter 33 as well as opens a gate 34 for connecting phase A clock pulses from the line 25 through the gate 34 to the input of the counter 33. Thus, the start scan signal clears the counter 33 and controls the entry of phase A clock pulses therein. Since successive clock pulses define successive storage locations and since each such clock pulse advances the counter 33, the condition of the counter at any time after the gate 34 is opened corresponds to the storage location then being scanned.

The condition of the internal address counter 33 is continuously analyzed by a converter 35 which is provided for converting this condition to a form suitable for entry into the internal address selector 20. As will become clear, a compare signal is generated on a line 36 for operating the switch 21 to close its n/o *a* contacts when the condition of the external address register 30 compares with an external address sensed by the various transducers. Thus, when a comparison signal appears on the line 36, the condition of the internal address counter 33 controls the operation of the internal address selector 20 to operate the positioning mechanism 17 according to the condition of the counter 33 at that time.

The signal lines associated with the various transducers 14 associated with discs 11 connect through the n/o *a* through *n* contacts of a relay 37 (not shown) to corresponding read amplifiers, shown in the drawing as a single block identified by the reference numeral 38, and the output of these read amplifiers connects in parallel to one side of a comparator unit 39. The external address register 30 comprises the second input to the comparator circuit and it will be understood, therefore, that the condition of the register 30 is continuously compared with the signals taken from the various read amplifiers 38. When the signals taken from the amplifiers 38 correspond to the condition of the register 30, i.e., when the external address in the register 30 compares with a scanned external address, the compare signal is generated by the comparator 39 and is entered onto the line 36.

In addition to operating the switch 21, the compare signal is arranged to close the gate 34 to prevent the entry of additional clock pulses into the internal address counter 33, thereby maintaining the counter in its condition at that time for controlling the positioning mechanism accordingly. It should be noted that during the scan operation the relay 37 (not shown) is in its energized condition, thereby connecting the various transducers 14 through the contacts 37*a* through 37*n* to the read amplifiers for supplying the recorded external addresses to the comparator 39.

It will be recalled that one of the objects of the present invention is to provide for the entry of a new external address into the file and to determine the appropriate internal address. For this purpose, a blank address detector 41 is provided. The detector 41 is arranged to generate a signal on a line 42 whenever the condition of the various read amplifiers 38 indicates that an external address storage location is blank. If, during a scanning operation, a blank address is detected, the blank address signal applied to the line 42 operates a transfer gate 43. The input to the gate 43 is taken from the counter 33 via a cable 44 which is arranged to indicate the condition of the counter at that time. When the gate 43 is operated, the condition of the counter 33 is arranged to operate a blank address buffer register 45 for storing this condition.

Additionally, the blank address signal connects via the line 42 to a subtract control trigger 46 for priming this trigger to operate upon the occurrence of the next start scan signal, the start scan signal being connected via the line 27 to the trigger 46. It should be noted at this time that the phase B clock pulse line 26 connects to the transfer gate 43 for opening the circuit from the cable 44 to the register 45. Thus, when the transfer gate 43 is turned on, its is turned off again by the next following phase B clock pulse, thereby permitting the entry of but one blank address into the blank address buffer register 45.

If the substract control trigger 46 is primed, the next following start scan signal operates this trigger to open a substract gate 47. Also, if there has been no comparison signal applied to the line 36, the switch 21 remains in the condition shown in the drawing, thereby controlling the transducers to remain on the address storage tracks. The phase A clock pulse line 25 connects through the subtract gate 47 to the register 45, and if the gate 47 is open these pulses are arranged to reduce the contents of the register by one for each such clock pulse until the register indicates a zero condition. At this time a signal is generated on a line 48 by a zero detector circuit 49, the signal on the line 48 being utilized to gate phase B clock pulses taken from the line 26 through a write pulse generator 50, if a line 53 indicates that there has been no comparison, to the input of an external address write matrix 52, the condition of which is controlled by the external address register 30.

Means (not shown) are provided for operating the relay 37 for placing the various contacts thereof in the condition shown in the drawing if no comparison is made during the initial scanning operation. Thus, if there has been no comparison, phase B clock pulses gated through the write pulse generator 50 are distributed by the matrix 52 under control of the register 30 to the appropriate transducers for recording the new external address in the storage location determined by the blank address entered into the blank address buffer register 45. Thus, for example, if the fifth external address storage location is the first blank address to be detected by the detector 41, a "5" is entered into the blank address buffer register 45. At the end of the scanning operation, if there has been no comparison signal, the relay 37 is actuated, thereby connecting the transducers to the output of the write matrix 52. Additionally, the start scan signal generated at the beginning of the next revolution operates the trigger 46 for controlling the entry of phase A clock pulses through the gate 47 to the blank address buffer register 45 for driving this register in the reverse manner. When the register 45 is driven to a zero condition, i.e., when the transducers are at external address storage location #5, phase B clock pulses are applied through the write matrix 52 to the appropriate transducers for recording the new external address in the fifth external address storage location.

Thus, the circuitry of the invention is arranged to determine internal addresses corresponding to external addresses entered therein via the line 31 and then to position the various transducers 14 at the determined internal address. Additionally, if a new external address is entered into the system, i.e., an address not recorded previously, the novel circuitry is arranged to generate a new internal address which corresponds thereto and at the same time it is controlled to record the new external address in the appropriate external address storage locations on the various discs.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A decoding device comprising a memory having a plurality of locations for storing external address signals according to the corresponding internal addresses, a first register for receiving external address signals corresponding to a selected internal address, means for scanning said storage locations for detecting external address signals, counting means operable in response to scanned storage locations, comparing means for detecting a comparison between the condition of said first register and detected external address signals, a second register, means for determining the absence of external address signals in one of said locations while said locations are being scanned for operating said second register according to said counting means, and means responsive to the absence of a detected comparison for entering signals determined by the condition of said first register in the storage location determined by the condition of said second register.

2. A device for converting external addresses to corresponding internal addresses comprising a storage medium having a plurality of external address storage locations and a plurality of general storage locations defined by internal addresses, said external address storage locations being arranged to store signals representative of external addresses in locations defined by corresponding internal addresses, a register for receiving external addresses to be converted, transducer means for sensing signals recorded in said storage medium, means for controlling said transducer means to scan said address storage locations, means for counting address storage locations scanned, means for generating a compare signal when the signals sensed by said transducer means correspond to the condition of said register, and means responsive to said compare signal for controlling said transducer means to scan a general storage location determined by the condition of said counting means when said compare signal is generated.

3. A decoding device comprising a memory having a plurality of predetermined locations for storing coded data signals, each of said locations having a predetermined relationship relative to a common reference which predetermined relationship defines another location in said memory for storing other information related to the associated stored coded data signal, register means for receiving a coded data signal to be decoded, means for scanning said predetermined locations, means for comparing the coded data signal received by said register means with said coded data signals as scanned to provide a control signal at coincidence, a counter, means for advancing said counter in accordance with the number of locations scanned from said reference, and means responsive to said control signal for disabling said advancing means to cause the condition of said counter to reflect said relationship and determine said other location where the information related to the coded data signal received by said register means is stored.

4. A decoding device comprising a memory having a plurality of predetermined locations for storing coded data signals, each of said locations having a predetermined relationship relative to a common reference which predetermined relationship defines another location in said memory for storing other information related to the associated stored coded data signal, register means for receiving a coded data signal to be decoded, means for scanning said predetermined locations, means for comparing the coded data signal received by said register means with said coded data signals as scanned to provide a control signal at coincidence, a counter, means for advancing said counter in accordance with the number of locations scanned from said reference, means responsive to said control signal for disabling said advancing means to cause the condition of said counter to reflect said relationship and determine said other location, and means responsive to the condition of said counter to render said determined other location directly available for the recording and reproducing of said related information.

5. A decoding device comprising a memory having a plurality of storage locations for storing coded signals, said storage locations being predetermined in accordance with the position in said memory where the decoded form of said coded data is stored, means for scanning said predetermined storage locations for detecting stored signals, means for counting scanned storage locations, means for comparing a coded signal to be decoded with detected signals, and means responsive to a comparison between said signals for determining according to the condition of said counting means when a comparison results the location of the decoded form of said stored signals effecting the comparison whereby the position in said memory of the decoded form of said signal to be decoded is determined.

6. A decoding device comprising a memory having a plurality of locations for storing coded data signals, each of said locations having a predetermined relationship relative to a common reference which predetermined relationship defines another location in said memory where the decoded form of the associated coded data is stored, means for scanning said storage locations for detecting said coded data signals stored therein, counting means for establishing said relationship, means for operating said counting means in response to said scanned storage locations, means for comparing a coded data signal to be decoded with detected coded data signals, means responsive to a comparison for determining said relationship established by said counting means, and means responsive to said relationship established by said counting means, and means responsive to said relationship established by said counting means for establishing the decoded form of said coded data signal to be decoded.

7. A decoding device comprising means for storing coded data signals in predetermined storage locations, means for scanning said predetermined locations for detecting stored signals, counting means, means responsive to scanned storage locations for advancing said counting means, means for entering a coded data signal to be decoded into said device, means for comparing said entered signal with said detected signals for indicating a comparison therebetween, and means operable in response to the condition of said counting means when a comparison is indicated to provide a decoded data signal corresponding to said entered signal.

8. A decoding device comprising a memory having a plurality of predetermined locations for storing external address signals and a plurality of general storage locations defined by internal addresses, each of said predetermined locations having a predetermined relationship relative to a common reference which predetermined relationship defines the internal address of one of said general storage locations, register means for receiving an external address corresponding to an internal address to be selected, means for scanning said memory, means for controlling said scanning means to scan said predetermined locations for determining external address signals stored therein, means for recording the number of external addresses scanned from said common reference until the predetermined location containing an external address corresponding to said external address received by said register means is reached, and means for controlling said scanning means to scan said general storage location whose external address corresponds to said recorded number.

9. A decoding device comprising means for storing coded data signals in predetermined storage locations according to the decoded form of the data signals, means for scanning said storage locations for detecting signals stored therein, means for determining the number of said locations scanned, a counter register, means responsive to the absence of detected signals in a given storage location for entering signals in said counting register which correspond to the count condition of said number determining means at the time the absence of a signal is detected, and means for controlling the entry of said coded data signals in said given location in response to a predetermined count condition of said counting register.

References Cited in the file of this patent

UNITED STATES PATENTS

| | | |
|---|---|---|
| 2,540,654 | Cohen | Feb. 6, 1951 |
| 2,721,990 | McNaney | Oct. 25, 1955 |
| 2,785,388 | McWhirter | Mar. 12, 1957 |
| 2,817,073 | Sorrells | Dec. 17, 1957 |
| 2,907,004 | Kun Li Chien et al. | Sept. 29, 1959 |
| 2,891,238 | Nettleton | June 16, 1959 |
| 2,925,589 | Schmitt | Feb. 16, 1960 |

OTHER REFERENCES

Control Engineering, pages 93–110, May 1956, "The Computer's Memory," by F. Fowler, Jr.